United States Patent [19]

Landers

[11] Patent Number: 4,700,762
[45] Date of Patent: Oct. 20, 1987

[54] PNEUMATIC TIRE THERAD WITH WIDE CENTRAL GROOVE AND ARCUATE GROOVES

[75] Inventor: Samuel P. Landers, Uniontown, Ohio

[73] Assignee: The Goodyear Tire & Rubber Company, Akron, Ohio

[21] Appl. No.: 848,347

[22] Filed: Apr. 4, 1986

Related U.S. Application Data

[63] Continuation of Ser. No. 715,056, Mar. 22, 1985, abandoned, which is a continuation of Ser. No. 571,755, Jan. 18, 1984, abandoned.

[51] Int. Cl.$^4$ .............................................. B60C 11/03
[52] U.S. Cl. ............................................... 152/209 R
[58] Field of Search ....................... 152/209 R, 209 D; D12/146–151

[56] References Cited

U.S. PATENT DOCUMENTS 2,756,798  7/1956  Palko et al. ...................... 152/209 R
4,057,089  11/1977  Johannson ....................... 152/209 R

FOREIGN PATENT DOCUMENTS 64934    11/1982  European Pat. Off. ........ 152/209 D
2707504  8/1978  Fed. Rep. of Germany ... 152/209 D
56-90702  7/1981  Japan ............................... 152/209 D
56-90703  7/1981  Japan ............................... 152/209 D
282181   12/1927  United Kingdom ............ 152/209 R
1310498  3/1973  United Kingdom ............ 152/209 R

*Primary Examiner*—Michael Ball
*Attorney, Agent, or Firm*—L. R. Drayer

[57] ABSTRACT

A high speed radial passenger vehicle tire having an aspect ratio of not greater than about 60. The ground-engaging tread portion of the tire comprising a wide substantially straight extending depression in the central portion of the tread having a contact width equal to or greater than 10% of the contact width of the ground-engaging tread portion. The tread portion is also provided with a plurality of substantially axially extending grooves extending from each side of said groove to the respective tread edge. The tread portion has a net to gross in the range of 50 to 65, a width equal to or greater than approximately 90% of the maximum tire section width and a cross-sectional radius greater to or equal than the circumferential radius of the tire. The wide groove and axially extending grooves having a depth no greater than approximately 0.25 inches.

11 Claims, 3 Drawing Figures

PNEUMATIC TIRE THERAD WITH WIDE CENTRAL GROOVE AND ARCUATE GROOVES

This is a continuation of application Ser. No. 715,056 filed on Mar. 22, 1985, now abandoned which is a continuation of application Ser. No. 571,755 filed on Jan. 18, 1984, now abandoned.

The present invention relates to a pneumatic tire and more particularly to a high speed ultra low profile radial passenger vehicle tire.

It is well known in the tire art that various performance characteristics are obtained at the sacrifice of other performance characteristics. For example, a low profile tire having high speed handling performance characteristics is characteristically poorer for wet traction and hydroplaning because of its wider and flatter tread. When such a tire is operated at higher speeds the wet traction and hydroplaning performance is greatly reduced. Also a tire that has been designed wtih a reduced tread gauge for lower rolling resistance is also prone to poorer wet traction and hydroplaning especially at higher speeds.

Applicant has found a particular combination of structural features which provides a high speed passenger vehicle highway tire designed for normal road surfaces having both performance handling characteristics and good wet traction and hydroplaning characteristics when a reduced tread gauge is used to reduce rolling resistance.

DETAILED DESCRIPTION OF THE INVENTION

Figure 1:
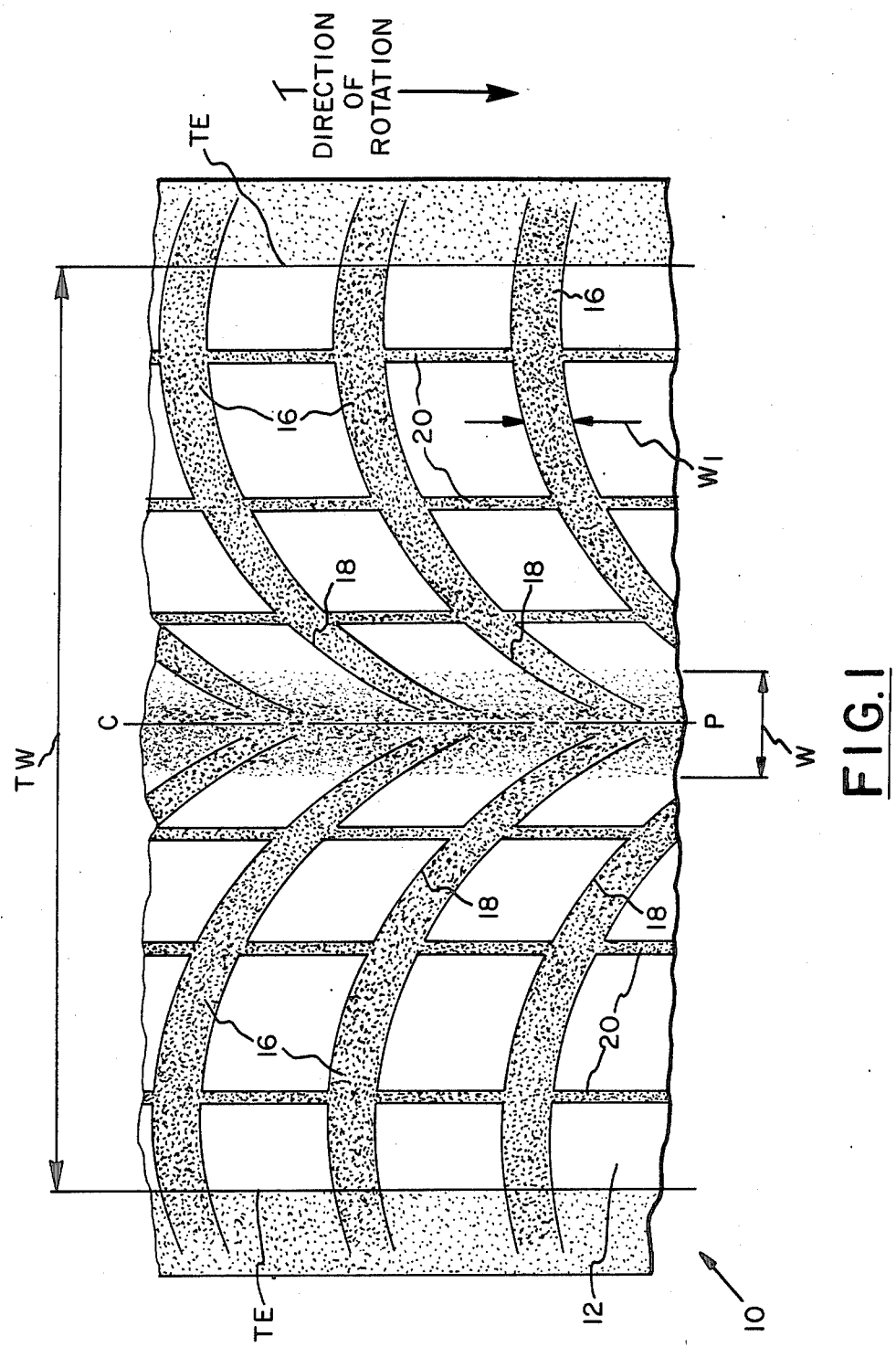
FIG. 1 is a fragmentary elevational view of the tread portion of a tire made in accordance with the present invention.
Figure 2:
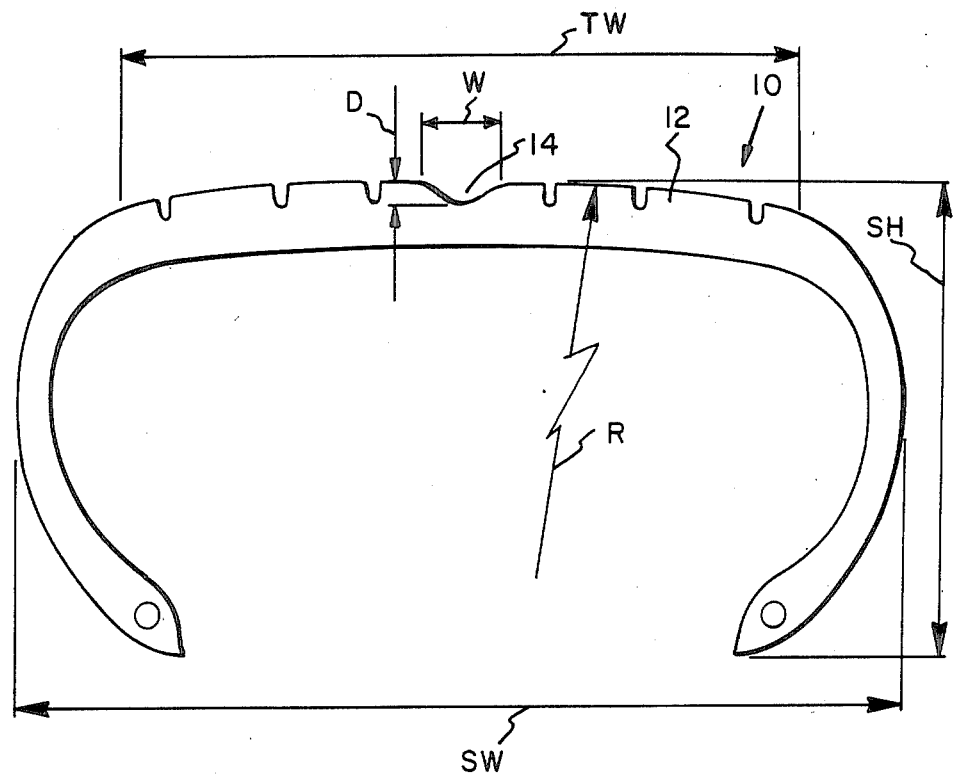
FIG. 2 is a cross-sectional view of a tire made in accordance with the present invention.

Referring to FIGS. 1 and 2, there is illustrated a ground-engaging tread portion 12 of a passenger vehicle tire 10 made in accordance with the present invention.

The tire 10 is of the radial type construction. For the purposes of this invention a tire of the radial type construction is a tire wherein the cords of the carcass reinforcement material are oriented at an angle from about 75° to 90° with respect to the mid-circumferential centerplane of the tire. The ground-engaging tread portion 12 is provided with a circumferentially substantially straight crown depression 14 which extends about the circumference of the tire 10. The centerline of the depression 14 does not vary a distance of more than about five pecent (5%) of the effective tread width TW from the mid-circumferential centerplane CP of the tire 10. For the purposes of this invention, the effective tread width TW is the maximum axial distance across the tread measured perpendicular to the mid-circumferential centerplane CP of the tire as taken from the footprint of a tire inflated to design inflation pressure and at rated load. Preferably, the crown depression 14 is spaced equally on either side of the mid-circumferential centerplane CP. The depression 14 has an effective contact width W, as measured from the footprint of the tire which is equal to or greater than about ten percent (10%) of the tread width TW. In the particular embodiment illustrated, the width W of the depression 14 is approximately eleven percent (11%) of the tread width TW. It is important that the depression 14 be placed substantially in the central portion of the tread as this is the area wherein a reduced tread contact pressure is observed in the footprint of the tire and also the region where the highest hydraulic pressure occurs. Accordingly, this region is especially critical if the tire is to maintain road contact, good wet traction and good hydroplaning characteristics when operated at high speeds, speeds greater than about 50 mph (miles per hour).

A plurality of substantially axially extending grooves 16 extend from each side of the depression 14 axially outward to the tread edge TE. Preferably the grooves 16 are oriented such that they form an angle of approximately forty-five degrees (45°) or greater at the point where it merges with the depression 14 and increases in a substantially continuous manner until it reaches substantially the tread edge of the tire so as to be substantially perpendicular as it reaches the tread edge. Additionally, the grooves 16 on either side of the mid-circumferential centerplane are oriented so as to extend in the same circumferential direction so that the tire is permanently designed to be operated in a single direction for normal forward movement. In the particular embodiment illustrated, the forward engaging surface 18 is the part of the tread elements which first comes in contact with the road. The grooves 16 have a width $W_1$ such that when in the footprint of the tire the grooves 16 do not close up so as to provide water channeling passages from the center of the tread to the tread edge TE of the tire. A sufficient number of axially extending grooves 16 are provided such that there are at least three grooves 16 on each side of the mid-circumferential centerplane CP of the tire 10 in the footprint at all times. Preferably, at least five.

In the particular embodiment illustrated, there is provided additional circumferentially extending narrow grooves 20. These narrow grooves preferably have a width no greater than approximately twenty-five percent (25%) of the crown depression 14. However these grooves may be entirely omitted, if so desired.

The net to gross of the ground-engaging tread portion 12 is in the range of fifty (50) to sixty-five (65), preferably between fifty (50) and sixty (60). In the particular embodiment illustrated, the net to gross is approximately fifty-eight (58). For the purposes of this invention, the net to gross is defined as the amount of rubber which comes in contact with the ground in the footprint of the tire as compared to the total available area of the footprint.

The tread width TW of the ground-engaging tread portion 12 is greater than or equal to approximately ninety percent (90%) of the maximum tire section width SW.

The tire 10 has a section height SH and a maximum section width SW. For the purposes of this invention, the section height is the distance from the nominal rim diameter to the radially outermost portion of the ground-engaging portion 12 and the maximum section width SW is the maximum width of the tire measured parallel to the axis of the tire and from the radially outer surface thereof. The tire 10 is an ultra low aspect ratio tire wherein the ratio of SH divided by SW (SH/SW) is not greater than about 60. In the particular embodiment illustrated the aspect ratio is 58.

The depth D of the crown depression 14, axially extending grooves 16 and narrow grooves 20 is substantially lower than a typical passenger vehicle tire. The recommended groove or non-skid depth for typical passenger tires is in the range from 0.325 inches (8.255 mm) to 0.375 inches (9.52 mm). Reduction of the non-skid depth (the depth of the grooves in the tread) substantially reduce the rolling resistance of a tire. The depth D should be no greater than about 0.25 inches (6.35 mm) and preferably no greater than about 0.20 inches (5.08 mm). In the particular embodiment illustrated, the depth D has been reduced to about 50% of recommended D (by Tire and Rim Assembly) to approximately 0.18 inches (4.57 mm).

Figure 3:
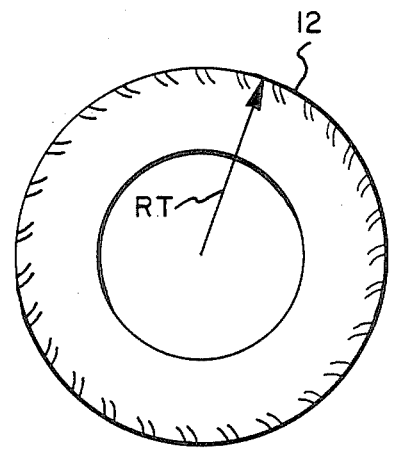
FIG. 3 is a side elevational view of a tire made in accordance with the present invention.

Referring to FIGS. 2 and 3, the ground-engaging tread portion 12 has a cross-sectional tread radius R which is equal to or greater than the radius RT (see FIG. 3) of the outer circumference of the tire as taken at the mid-circumferential centerplane of the tire. In the particular embodiment illustrated, the radius RT of the tire is approximately 12 inches whereas the cross-sectional tread radius RT of the inflated tire is approximately 16 inches.

It is understood that various design modifications can be made without departing from the scope of the present invention. The scope of the claims being limited to the attached claims.

I claim:

1. A tire comprising a carcass of reinforcement material having cords oriented at an angle from about 75° to 90° with respect to the mid-circumferential centerplane of the tire and a ground engaging tread portion extending circumferentially about said carcass reinforcement material, the interior surface of the crown portion of said tire being continuously concave when viewed from the axis of rotation of the tire, said tread portion having a substantially straight depression therein that extends circumferentially about the tire such that a centerline of the depression does not vary a distance of more than five percent of the effective tread width from the mid-circumferential centerplane of the tire, said depression having a contact width equal to or greater than ten percent of the contact width of said tread portion as measured from a footprint of the tire, a plurality of substantially axially extending grooves extending axially outwardly from each side of said depression to the respective tread edges, each axially extending groove being oriented such that it forms an angle of approximately forty-five degrees or greater at the point where it merges with the depression and increases in a substantially continuous manner so as to be substantially perpendicular as it reaches the tread edge, a sufficient number of axially extending grooves are provided so that at least three grooves on each side of said depression are in a footprint of the tire, said tread portion having a net to gross ratio in the range of 50 to 65, said tread portion having a tread width equal to or greater than approximately ninety percent of the maximum section width of the tire, said tread portion having a radius equal to or greater than the circumferential radius of the tire as measured at the mid-circumferential centerplane of the tire, said tire having as aspect ratio of not greater than 0.60, and said depression and axially extending grooves having depths equal to or less than 0.2 inches.

2. A tire according to claim 1 wherein the depth of said grooves is approximately 0.18 inches.

3. A tire according to claim 1 wherein there are at least five axially extending grooves on each side of said wide groove in a footprint of the tire.

4. A tire according to claim 1 wherein the radius of the tire circumference is approximately 12 inches and the tread radius is approximately 16 inches.

5. A tire according to claim 1 wherein said wide groove has a contact width equal to approximately 11% of the tread width in a footprint of the tire.

6. A tire according to claim 1 wherein the net to gross ratio of the tread portion is in the range of 55 to 60.

7. A tire according to claim 1 wherein said ground-engaging tread portion has a tread width of approximately 91% of the maximum section width of said tire.

8. A tire according to claim 1 wherein each said axially extending groove has a first and a second spaced apart edge, each said edge forming a substantially continuous arc from the crown depression to the respective tread edge and wherein the separation between said edges increases in a substantially continuous manner from the crown depression at least through a portion of said tread portion.

9. A tire according to claim 8 wherein said axially extending grooves are symmetrical with respect to one another about the tires mid-circumferential centerplane and a sufficient number of said axially extending grooves are provided so that at least three of said grooves on each side of said crown depression are in a footprint of the tire.

10. A tire according to claim 9 further characterized in that said tread portion is provided with circumferentially extending narrow grooves, each said narrow groove having a width no greater than 25% of the crown depression.

11. A tire according to claim 10 wherein said narrow grooves are all substantially equal in width.

* * * * *